US012358197B2

(12) United States Patent
Persinger et al.

(10) Patent No.: US 12,358,197 B2
(45) Date of Patent: Jul. 15, 2025

(54) METHOD AND SYSTEM TO ELIMINATE DROPPING OF MOLDS FOR A MOLDING MACHINE ARRANGEMENT

(71) Applicant: Robert Bosch GmbH, Stuttgart (DE)

(72) Inventors: Michael Persinger, Fort Wayne, IN (US); Kurt F. Meyer, Hamilton, IN (US)

(73) Assignee: Robert Bosch GmbH, Stuttgart (DE)

( * ) Notice: Subject to any disclaimer, the term of this patent is extended or adjusted under 35 U.S.C. 154(b) by 125 days.

(21) Appl. No.: 18/331,454

(22) Filed: Jun. 8, 2023

(65) Prior Publication Data
US 2024/0408805 A1 Dec. 12, 2024

(51) Int. Cl.
*B29C 45/76* (2006.01)
*B29C 45/17* (2006.01)
*B29C 45/84* (2006.01)

(52) U.S. Cl.
CPC .......... *B29C 45/76* (2013.01); *B29C 45/1744* (2013.01); *B29C 45/84* (2013.01); *B29C 2045/1746* (2013.01); *B29C 2945/76642* (2013.01); *B29C 2945/76705* (2013.01)

(58) Field of Classification Search
CPC ......... B29C 45/76; B29C 45/17; B29C 45/84; B29C 45/1744; B29C 2045/1746; B29C 2945/76705; B29C 45/80; B29C 45/7653
See application file for complete search history.

(56) References Cited

U.S. PATENT DOCUMENTS

| 4,421,469 A * | 12/1983 | Egger ................... B29C 31/006 425/186 |
| 7,258,539 B2 | 8/2007 | Lowe et al. |
| 8,047,826 B2 | 11/2011 | Kimura |
| 10,493,679 B2 | 12/2019 | Tozawa |
| 2015/0290853 A1 * | 10/2015 | Hoshikawa ......... B29C 45/1774 362/418 |
| 2021/0206040 A1 | 7/2021 | Kitaura |
| 2021/0331366 A1 | 10/2021 | Persinger et al. |
| 2021/0362389 A1 | 11/2021 | Yoshida |
| 2022/0227025 A1 | 7/2022 | Akamatsu |

FOREIGN PATENT DOCUMENTS

| EP | 3763504 | * | 1/2021 | ............. B29C 45/03 |
| WO | 2009130721 A1 | | 10/2009 | |

* cited by examiner

*Primary Examiner* — Alison L Hindenlang
*Assistant Examiner* — Shibin Liang
(74) *Attorney, Agent, or Firm* — Michael Best & Friedrich LLP

(57) ABSTRACT

A method and system is provided for operating a molding machine to prevent damage when replacing a mold. The molding machine includes movable and fixed magnetic platens to open and close a mold. The system includes a flux sensor. When a set-up mode is selected, an electronic processor is configured to: enable movement of the movable magnetic platen when the crane is above the molding machine; the molding machine receives a crane load signal that is less than a marginal load value; and the flux sensor senses that the magnetic platens are magnetized and the magnetic circuit is completed; and enable movement of the movable platen to remove/insert the mold when the crane is above the molding machine; the molding machine receives a crane load signal wherein a load is greater than the marginal load value; and the flux sensor senses that the magnetic circuit is not completed.

20 Claims, 6 Drawing Sheets

METHOD AND SYSTEM TO ELIMINATE DROPPING OF MOLDS FOR A MOLDING MACHINE ARRANGEMENT

BACKGROUND

The present arrangement relates to a method and system for eliminating dropping of molds that are being set into or pulled from a molding machine by enabling movement of platens only when the molds are secure.

A molding machine with magnetic platens to secure a mold is utilized to make molded products. When molds are removed from or mounted in presses to produce different products, the molds are not always attached to cables of a hoist of a crane or the magnetic platens are not magnetized to support the mold when the platen opens, resulting in the mold falling.

SUMMARY

A method and system is provided to eliminate dropping of molds from a molding machine. A molding machine is also provided for receiving molds and for being operated to create molded products, the molding machine including: magnetic platens including a movable magnetic platen and a fixed magnetic platen for securing the mold thereto, the movable magnetic platen being movable to open and close a mold; a flux sensor for sensing whether the magnetic platens are magnetized and supporting the mold by a magnetic circuit that is completed via presence of ferrous material in the mold or that the magnetic platens are demagnetized; an input device for selecting operating conditions for the molding machine; a display for displaying operating conditions for the molding machine; and an electronic processor. When a set-up mode is selected, the electronic processor being configured to: enable movement of the movable platen when the molding machine receives a crane position signal that a hoist of the crane is above the molding machine; the molding machine receives a crane load signal wherein a crane load is less than a marginal load value; and the flux sensor senses that the platens are magnetized and that the magnetic circuit is completed via presence of ferrous material in the mold. The electronic processor is also configured to enable movement of the movable platen to remove/insert the mold when the molding machine receives a crane position signal that the hoist of the crane is above the molding machine; the molding machine receives a crane load signal wherein a crane load is greater than the marginal load value; and the flux sensor senses that the magnetic platens are demagnetized and the magnetic circuit is not completed.

A method for selecting and performing a set-up mode for a molding machine having a fixed magnetic platen and a movable magnetic platen, includes: manually selecting the set-up mode; determining whether a position of a crane having a hoist is above the molding machine with a crane position sensing arrangement; sensing whether a load greater than a marginal load is being supported on the hoist of the crane with a crane load sensor; sensing whether the magnetic platens are magnetized and that the magnetic circuit is completed via presence of ferrous material in the mold or demagnetized and the magnetic circuit is not completed with a flux sensor; enabling movement of the movable platen when the crane position sensing arrangement senses that the crane is above the molding machine; the crane load sensor senses a load that is less than a marginal load value; and the flux sensor senses that the platens are magnetized; and enabling movement of the movable platen to remove or insert a mold when the crane position sensing arrangement senses that the crane is above the molding machine; the crane load sensor senses a load that is greater than the marginal load value; and the flux sensor senses that the platens are demagnetized and the magnetic circuit is not completed.

A molding machine system comprises a crane including a hoist on a trolley for setting and pulling of molds, the crane further including: a crane position sensing arrangement for determining a position of the crane and hoist; and a crane load sensor for sensing a load supported on the hoist. The molding machine system includes a molding machine for receiving a mold and for being operated to create molded products, the molding machine including: a movable magnetic platen and a fixed magnetic platen for securing the mold thereto, the movable magnetic platen being movable to open and close a mold; a flux sensor for sensing whether the magnetic platens are magnetized and supporting the mold by a magnetic circuit that is completed via presence of ferrous material in the mold or demagnetized and the magnetic circuit is not completed; an input device for selecting operating conditions for the molding machine; a display for displaying operating conditions for the molding machine; and an electronic processor for when a set-up mode is selected. The electronic processor is configured to: enable movement of the movable magnetic platen when the crane position sensing arrangement senses that the crane is above the molding machine; the crane load sensor senses a load that is less than a marginal load value; and the flux sensor senses that the magnetic platens are magnetized and the magnetic circuit is completed; and enable movement of the movable magnetic platen to remove/insert the mold when the crane position sensing arrangement senses that the crane is above the molding machine; the crane load sensor senses a load that is greater than the marginal load value; and the flux sensor senses that the magnetic platens are demagnetized and the magnetic circuit is not completed.

DETAILED DESCRIPTION

Before any embodiments, examples, aspects, or features are explained in detail, it is to be understood that those embodiments, examples, aspects and features are not limited in their application to the details of construction and the arrangement of components set forth in the following description or illustrated in the following drawings. Other embodiments, examples, aspects, and features are possible and are capable of being practiced or of being carried out in various ways. Also, it is to be understood that the phraseology and terminology used herein is for the purpose of description and should not be regarded as limiting.

Figure 1:
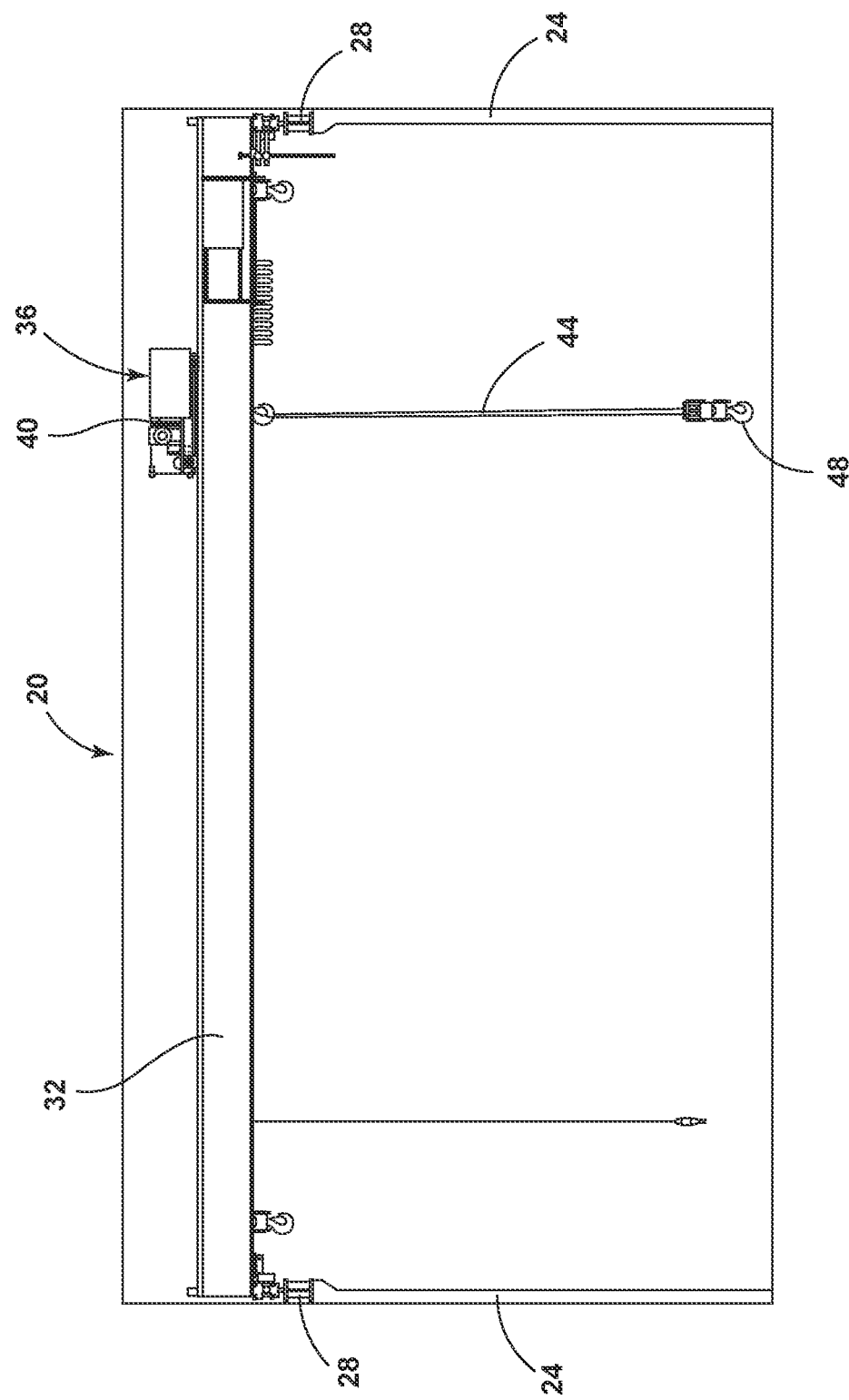
FIG. 1 is a front view diagram of a crane for use with a molding machine according to some examples.

FIG. 1 illustrates an example crane 20 for carrying molds to a molding machine. The crane 20 includes runway beams 24 that are oriented vertically to support horizontally oriented rails 28. The spaced parallel horizontal rails 28 are orthogonal to a bridge 32 that is supported thereon. The bridge 32 is movable along the rails 28. The bridge 32 supports a trolley 36 that is movable along the length of the bridge 32 in a direction perpendicular to the movement direction of the bridge. The trolley 36 supports a powered hoist 40. The hoist 40 includes a cable 44 having a hook 48. In one example, the cable 44 is a steel cable. The hoist 40 retracts or extends the cable 44 depending on inputs by a user. The hoist 40 is on the trolley 36 and the trolley is on the bridge 32. The hoist 40 moves up/down, the trolley 36 moves along one horizontal axis, and the bridge 32 moves along an orthogonal horizontal axis for setting and pulling of molds.

In some examples multiple cranes 20 are provided on multiple bridges 32 on the rails 28. Multiple trolleys 36 also are provided in one example. Finally, multiple hoists 40 are provided in another example.

Figure 2:
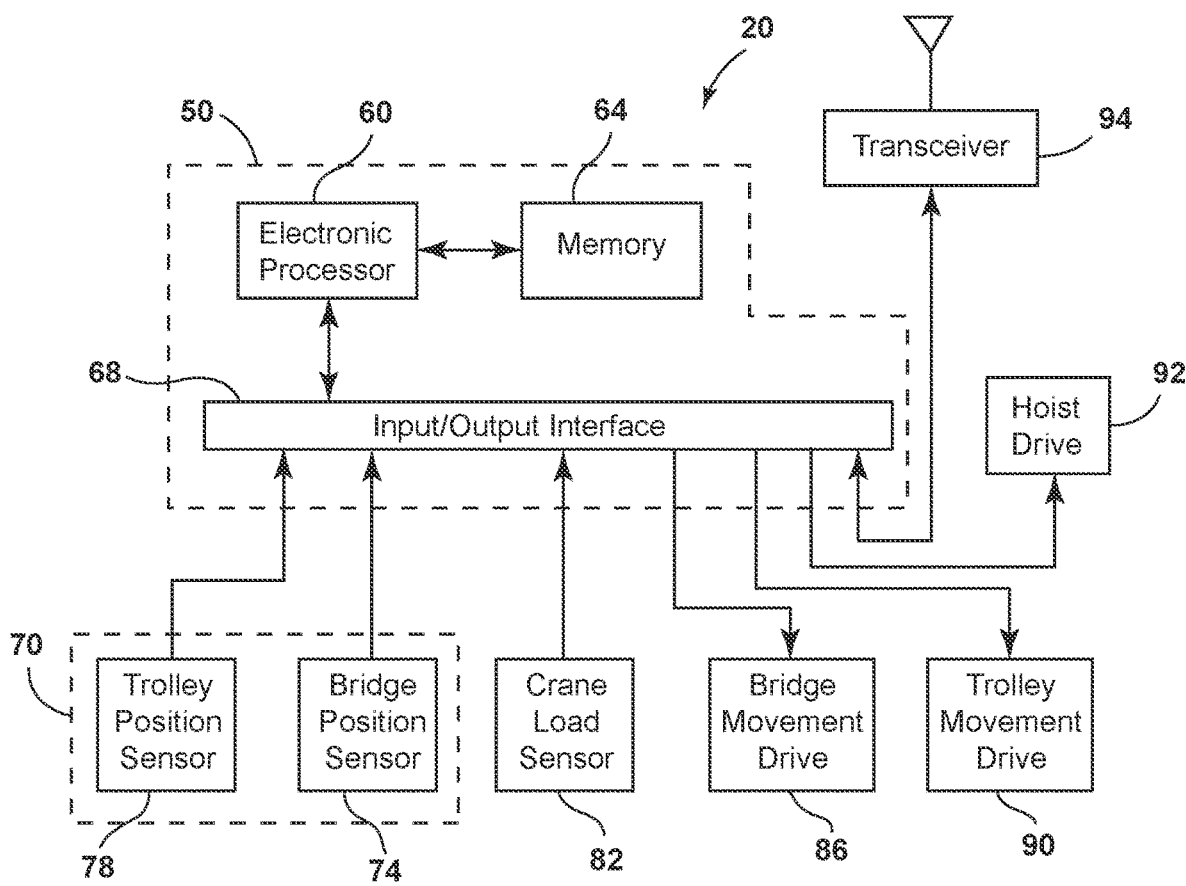
FIG. 2 is a block diagram of the crane of FIG. 1 that includes an electronic processor according to some examples.

FIG. 2 illustrates a block diagram of the crane 20. The crane 20 includes an electronic control unit 50 having an electronic processor 60 and one or more non-transitory, computer-readable memory 64. In the example shown in FIG. 2, the electronic control unit 50 includes a memory 64 or non-transitory computer readable medium, for example, including a random access memory ("RAM") and a read-only memory ("ROM"), connected to the electronic processor 60. The electronic control unit 50 also includes an input/output (I/O) interface 68 that transmits and receives data. It should be understood that the electronic control unit 50 can include multiple electronic processors, additional computer-readable memory, multiple I/O interfaces, and/or additional components or modules (e.g., hardware, software, or a combination thereof).

The electronic processor 60 shown in FIG. 2 receives information from the I/O interface 68 and processes the information by executing instructions for one or more software modules stored to the memory 64 of the electronic control unit 50, such as a read-only memory (ROM). The electronic processor 60 stores information to and retrieves information from the random access memory (RAM) and information received from other controllers or sensors through the input/output interface 68. The non-transitory computer readable memory 64 of the electronic control unit 50 include volatile memory, non-volatile memory, or a combination thereof and, in various constructions, may also store operating system software, applications/instructions data, and combinations thereof.

FIG. 2 further shows a crane position sensing arrangement 70 that includes a bridge position sensor 74 that determines the position of the bridge 32 relative to the rails 28 and a trolley position sensor 78 that determines the position of the trolley 36 and the hoist 40 along a length of the bridge 32. In one example, the bridge position sensor 74 includes a plurality of contact switches spaced along a length of at least one of the rails 28. The contact switches providing a signal when the trolley 36 contacts the switches. Other mechanical, optical, and electromagnetic sensing arrangements are also contemplated to detect the position of the bridge 32.

The crane position sensing arrangement 70 shown in FIG. 2 also includes a trolley position sensor 78. In one example, the trolley position sensor 78 includes a plurality of contact switches spaced along a length of the bridge 32 that contacts the trolley 36 moving thereon. Other mechanical, optical, and electromagnetic sensing arrangements are also contemplated to detect the position of the trolley 36. Thus, the crane position sensing arrangement 70 includes a bridge position sensor 74 that determines the position of the bridge 32 relative to the rails 28 and a trolley position sensor 78 that determines the position of the trolley 36 and the hoist 40 along a length of the bridge 32.

FIG. 2 also illustrates a crane load sensor 82. The crane load sensor 82 determines or measures weight of a mold suspended on one or more cables 44. The crane load sensor 82 is a mechanical, electro-mechanical, optical or other type of load sensor. In an example with multiple cranes 20, multiple bridge position sensors 74, trolley position sensors 78, and crane load sensors 82 are provided for the respective cranes and hoists 40.

FIG. 2 also illustrates a bridge movement drive 86 and a trolley movement drive 90. In one example, the bridge movement drive 86 is an electric motor for moving the bridge 32 along the rails 28 in a first direction or an opposing direction. Likewise, an example trolley movement drive 90 includes an electric motor for moving the trolley 36 along the bridge 32. Other examples include a hydraulic drive or other arrangement for the bridge movement drive 86 or the trolley movement drive 90. In use, the crane 20 is positioned on a bridge 32, and the bridge is movable along opposing parallel rails 28 at ends thereof in a first direction of the parallel rails, the crane 20 being movable along the length of the bridge 32 in a second direction that is perpendicular or transverse to the first direction.

FIG. 2 shows a hoist drive 92. An example hoist drive 92 is an electric motor for the powered hoist 40 to raise or lower a mold secured to the cable 44 via the hook 48. Other drive mechanisms are also contemplated. A chain connecting the mold to the hook 48 of the cable 44 is also contemplated.

Figure 3:
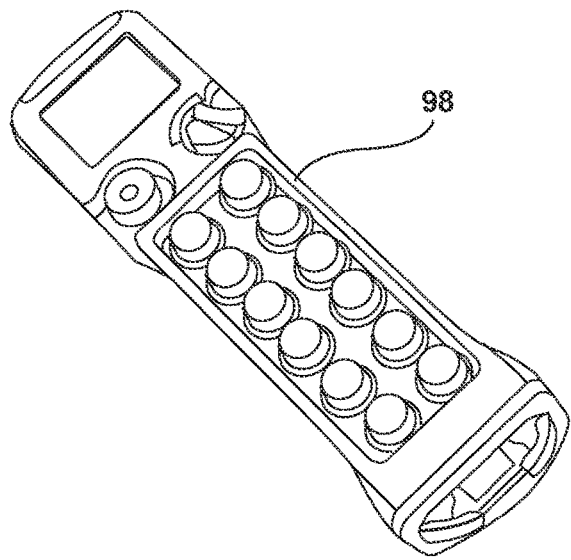
FIG. 3 is a perspective view of a remote crane controller according to some examples.

FIG. 2 includes a transceiver 94 for receiving radio frequency (RF) signals in one example to control the crane 20. Further, the transceiver 94 is capable of transmitting a crane load signal and crane position signals to the molding machine. FIG. 3 shows a remote crane controller 98 that controls movement of the bridge 32 in the first direction and movement of the trolley 36 and hoist 40 in the second direction that is orthogonal to the first direction. Other example remote crane controllers 98 include optical, infrared, Bluetooth, and other communication arrangements.

Molding Machine

Figure 4:
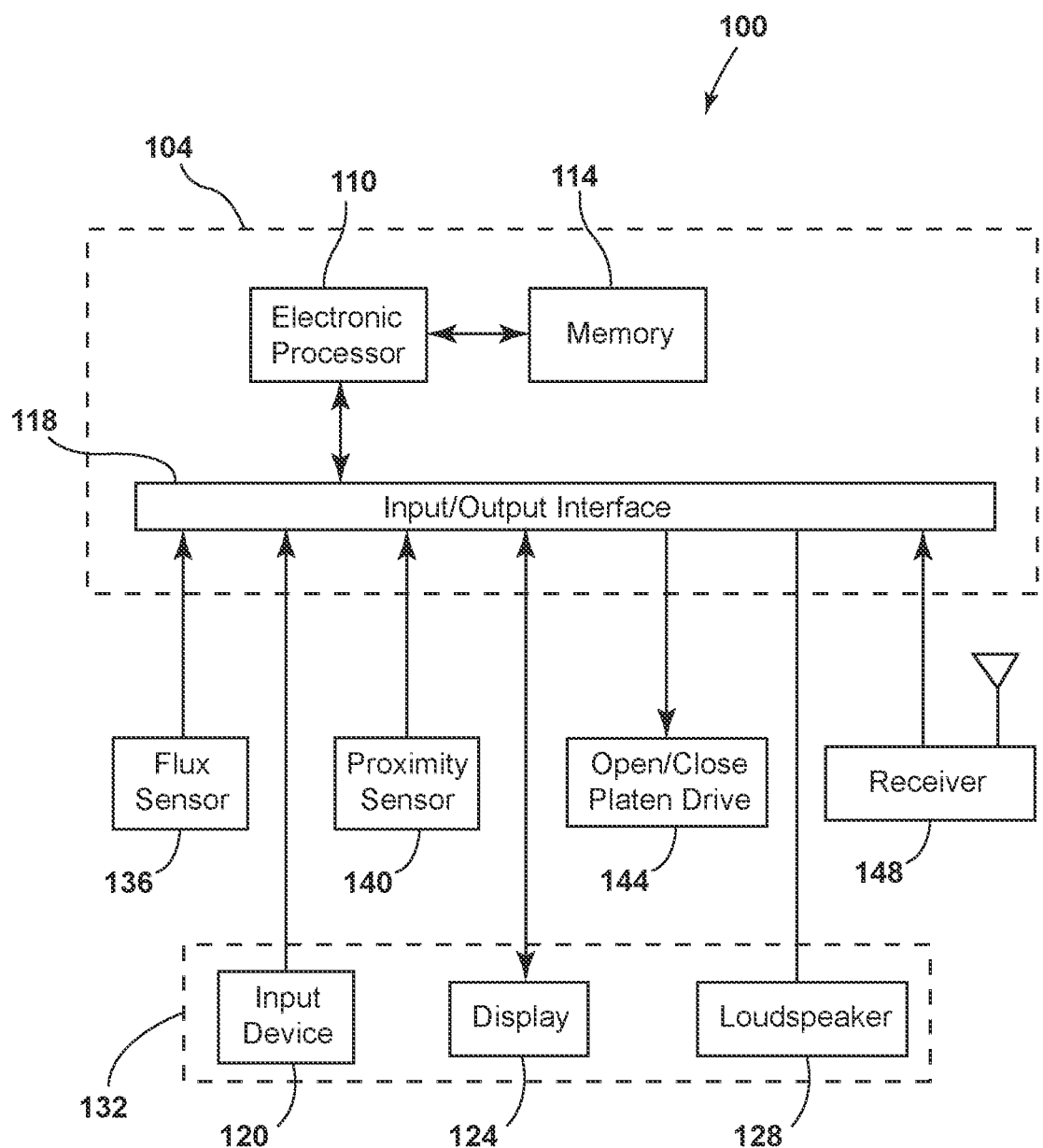
FIG. 4 is a block diagram of a molding machine that includes an electronic processor according to some examples.

FIG. 4 illustrates a block diagram of a molding machine 100. The molding machine includes an electronic control unit 104 having an electronic processor 110 and one or more non-transitory, computer-readable memory 114. In the example shown in FIG. 3, the electronic control unit 104 includes a memory 114 or non-transitory computer readable medium, for example, including a random access memory ("RAM") and a read-only memory ("ROM"), connected to the electronic processor 110. The electronic control unit 104 also includes an input/output (I/O) interface 118 that transmits and receives data. It should be understood that the electronic control unit 104 can include multiple electronic processors, additional computer-readable memory, multiple I/O interfaces, and/or additional components or modules (e.g., hardware, software, or a combination thereof).

FIG. 4 shows an input device 120 for providing inputs to the electronic control unit 104. In one example, the input device 120 is a pendant or a remote controller. Other input devices are contemplated. The molding machine 100 also includes a display 124 and a loudspeaker 128 for outputting messages or alarms. The display 124 is a video screen in one example. In another example, the input device 120, the display 124, and the loudspeaker 128 are combined in an integrated touch screen 132.

The molding machine 100 also includes flux sensors 136 that sense or measure flux to ensure a proper magnetic circuit between magnetic platens and a mold. In one example discussed later herein, the magnetic platens, and components such as the flux sensors 136 provided therewith, are an aftermarket product mounted onto platens of the molding machine 100. The flux sensors 136 are provided within or on the magnetic platens. In one example, the flux sensors 136 must have an air gap of less than 0.008 inches to ensure that the magnetic circuit changes polarity of the magnetic platens. In one example, the flux sensors 136 are spaced about 0.006 inches away from an outer surface of the magnetic platens. Two flux sensors 136 are contemplated for each magnetic platen in one example. In use, the flux sensor 136 senses the level of flux being returned through a magnetic circuit formed by the mold and the electronic processor 110 compares that flux level to the flux produced by the magnet. When the returned flux value is above a certain percentage of the flux being sent out (for example 80%), then the electronic processor 110 decides that there is a ferrous material of a mold next to the magnet on the magnetic platen, completing the magnetic circuit. The flux sensor 136 will not detect a completed magnetic circuit when the mold is aluminum or another non-ferrous material.

The molding machine 100 illustrated in FIG. 4 includes an optional proximity sensor 140 mounted on the magnetic platen that senses a mold to allow magnetization. In one example, multiple proximity sensors 140 are contemplated for placement on each of the magnetic platens 160. In one example, the proximity sensors 140 are disposed at least 0.006 inches from the surface of the magnetic platen 160. The distance from the proximity sensor 140 to the object can be 0.008 inches in operation to properly detect the presence of the mold. The proximity sensors 140 can be inductive or capacitive sensors. The inductive or capacitive sensor can be a dielectric type or a conductive type of sensor. The dielectric type of capacitive sensor detects both metallic and nonmetallic objects. The other capacitive conductive type sensors only detect electrically conductive material. The proximity/presence of a mold is detected regardless of whether the mold is made with a ferrous material.

Other controllers, devices, and sensors are also connected to the electronic control unit 104 of the molding machine. One example is set forth in commonly owned U.S. Patent Publication 2021/0331366, which discloses a heat removal system and method for an injection molding machine, the disclosure of which is hereby incorporated by reference in its entirety.

The molding machine 100 illustrated in FIG. 4 further includes an open/close platen drive 144 that moves the movable magnetic platen between an open and close position for the mold secured to the molding machine 100. Finally, the molding machine 100 includes a receiver 148 configured to receive information from the crane 20. More specifically, the receiver 148 is configured to receive a crane load signal or crane load value supported on the hoist 40 from a crane load sensor 82 and crane position signals from the bridge position sensor 74 and the trolley position sensor 78. The crane load value and crane position signals are transmitted by the transceiver 94 of the crane 20 to the receiver 148. The molding machine in FIG. 4, in some examples, includes a unit control circuit sensor (not shown) that verifies sufficient current flow to apply enough current flow to change the polarity of the magnetic platens 160.

Figure 5:
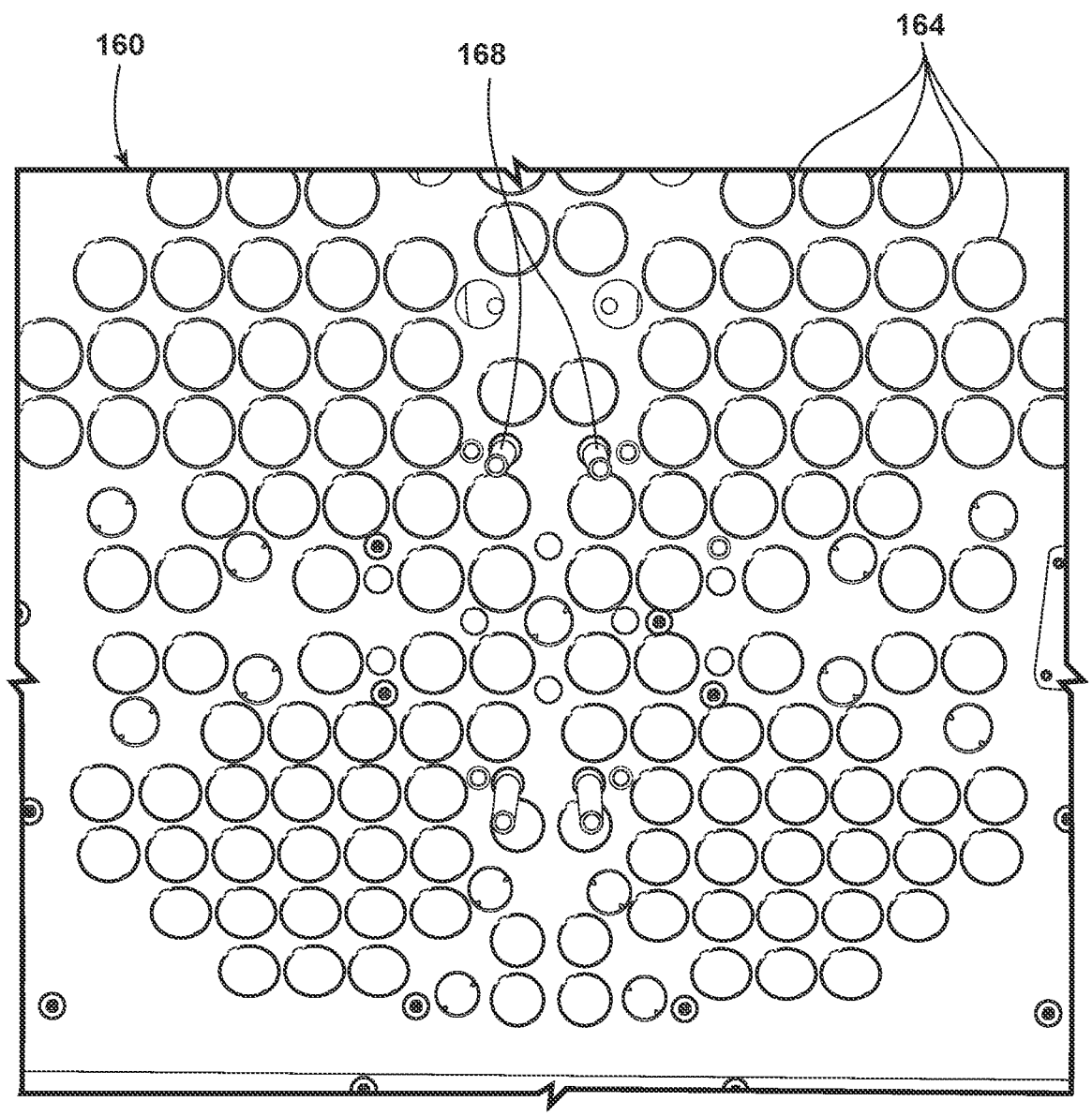
FIG. 5 is a partial view of a portion of a magnetic platen having magnetic poles.

FIG. 5 illustrates a face of a magnetic platen 160 that includes magnetic poles 164 and shows retractable knockout bars 168 that extend from the molding machine 100 through apertures in the magnetic platens 160. The magnetic poles 164 include a permanent non-reversible magnet core near the face of the platen, a permanent reversible magnet core directly behind that, and an electro-magnet disposed around the permanent reversible magnet core. The retractable knockout bars 16 are used to remove molded material within a mold after completion of a molding process. In one example, magnetic platens 160 are provided including a movable magnetic platen and a fixed magnetic platen. In many examples, the magnetic platens 160 are aftermarket products that are permanently fixed or mounted to original platens of the molding machine 100. In an example, the magnetic platens 160 as an aftermarket product, include a magnetic platen controller that also includes the flux sensors 136, the proximity sensors 140, the unit control circuit sensor that verifies sufficient current flow, a switch or actuator to energize the electro-magnet, and the open/close platen drive 144 for moving the magnetic platens 160. In one example, the electro-magnet includes a copper wire wrapped around a plastic spool that receives the permanent reversible magnet core.

Figure 6:
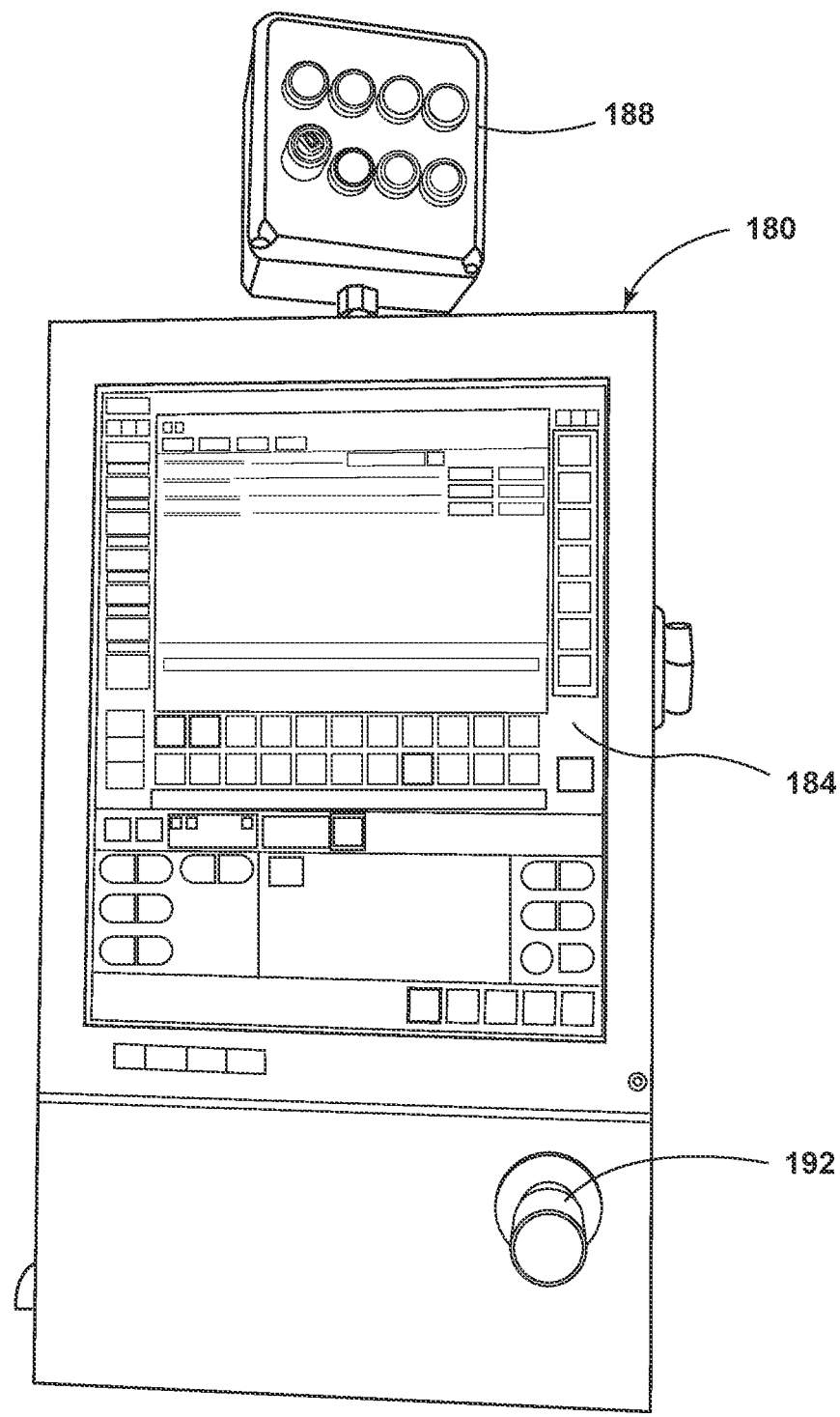
FIG. 6 is a perspective view of a molding machine console and a pendant for controlling magnetic platens.

FIG. 6 shows a molding machine console having a display 184. In one example, the display is a touch screen for controlling settings. A pendant 188 is provided for controlling the magnetic platens 160 in one example. An emergency stop 192 is provided for use by an operator when an emergency occurs.

The crane 20, in combination with one or more molding machines 100, defines a molding machine system. As set forth below, an operator operates the molding machine and operates the crane 20 of the molding machine system in order to change molds.

Operation

Figure 7:
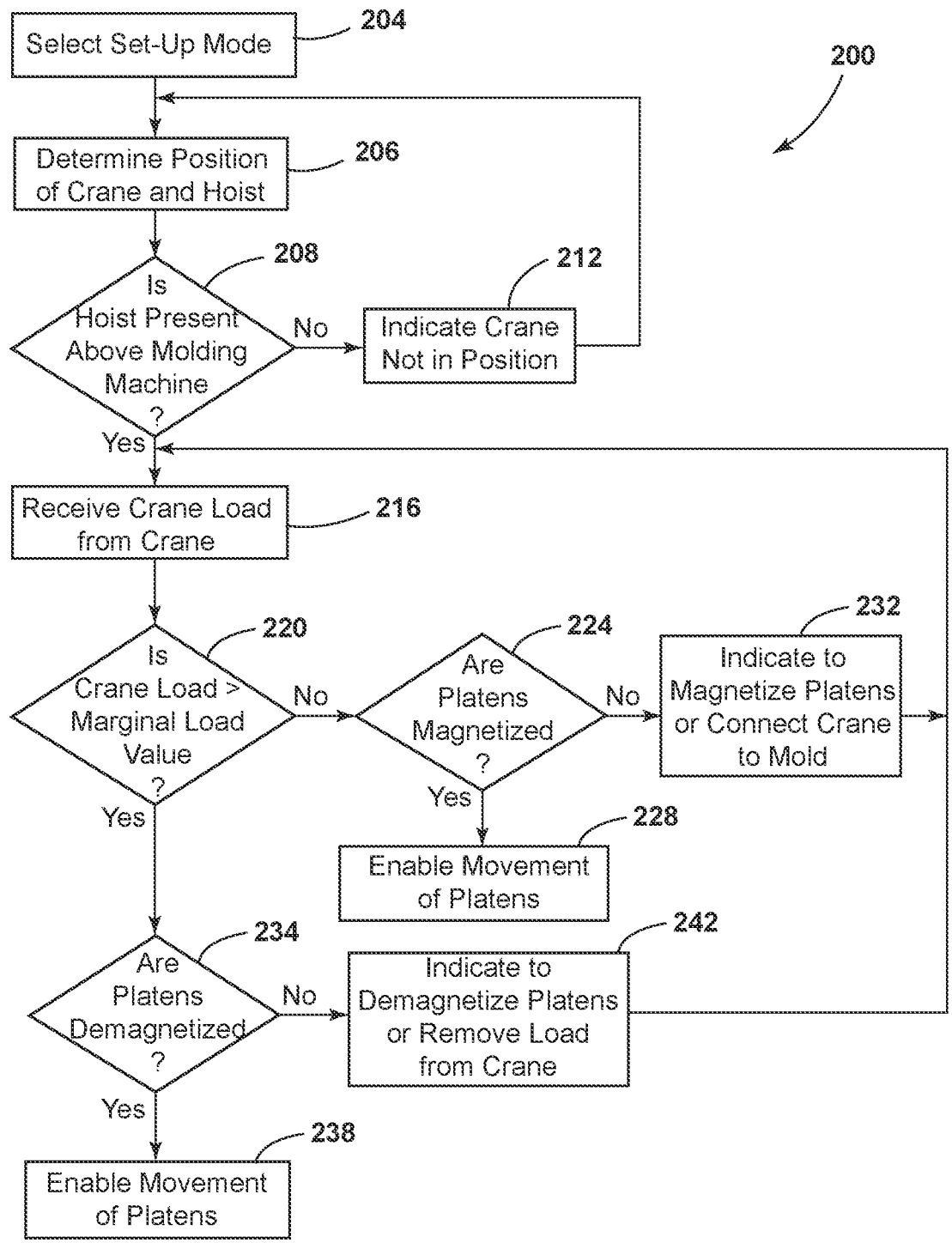
FIG. 7 is a flow chart of a set-up mode for a molding machine for changing a mold.

FIG. 7 is a flow chart 200 illustrating operation of the molding machine 100 for changing molds.

In a first selecting step 204, an operator selects a set-up mode by pushing a button on the molding machine console 180. The electronic processor 110 executes instructions stored in a non-transitory memory 114. First, the electronic processor 110 of the molding machine 100 advances to step 206.

At step 206, the receiver 148 of the molding machine 100 receives a position of the bridge 32 relative to the rails 28 of the crane 20 from a bridge position sensor 74 and a trolley position for the hoist 40 along a length of the bridge from a trolley position sensor 78. The electronic processor 110 receives the bridge position and trolley position via the input/output interface 118 and determines whether the hoist 40 of the crane is located above the molding machine 100 at step 208. The molding machine 100 is one of a plurality of molding machines disposed in rows and/or columns below the crane 20 in one example.

In another example of step 206, the electronic processor 60 of the crane 20 determines the position of the crane an hoist 40 and transmits the determined position via transceiver 94 to the molding machines/all molding machines in an environment for receipt by the receiver 148 and use by the electronic processor 110.

After step 206, the electronic processor advances to step 208. At step 208, the electronic processor 110 determines whether the hoist 40 and the crane 20 are above the molding machine 100 including the electronic processor 110. When the hoist 40 of the crane 20 is not disposed or located above the molding machine at step 208, the electronic processor 110, advances to step 212. At step 212 a visual indication is provided on the display 124, 184 of the molding machine 100 and/or an audible signal or a warning message is provided by the loudspeaker 128 that states that the crane 20 and hoist 40 are not in position. The electronic processor 110 then returns to step 206.

When the hoist 40 of the crane is disposed above the molding machine, the electronic processor advances to step 216. At step 216, receiver 148 of the molding machine 100 receives the crane load transmitted by the transceiver 94 of the crane. The receiver 148 provides the crane load to the electronic processor 110. The electronic processor 110 advances to decision step 220.

At decision step 220 the electronic processor 110 determines whether the crane load is greater than a marginal load value. The marginal load value can be in a range of 200 to 600 pounds or more. The purpose of the marginal load value is to provide a value that ensures that the hoist 40 of the crane is supporting a mold.

When the crane load is not greater than the marginal load value at decision step 220, the electronic processor 110 advances to decision step 224. At decision step 224, the electronic processor 110 determines whether the magnetic platens are magnetized and adjacent a ferrous mold based on an output or signal from the flux sensor 136. When the platens are magnetized, the electronic processor 110 advances to step 228. At step 228, the electronic processor 110 enables movement of the movable magnetic platen 160 by an operator of the molding machine 100 to open or close the mold. Otherwise, operation of the movable magnetic platen 160 is prevented by the electronic processor 110, even if manual selection or actuation is attempted by a molding machine operator.

When the magnetic platens are not magnetized at decision step 224, the electronic processor 110 advances to step 232. At step 232, the electronic processor 110 provides a visual indication on the display 124, 184 of the molding machine 100 and/or an audible signal or a warning message is provided by the loudspeaker 128 that states that the magnetic platens must be magnetized or the crane must be connected to the mold. From step 232, the electronic processor 110 returns to step 216.

At step 216, the crane load is again provided to the electronic processor 110 as discussed above. At decision step 220, when the crane load is greater than the marginal load value, the electronic processor 110 advances to decision step 234.

At decision step 234, the electronic processor 110 determines whether the platens and demagnetized depending on an input from the flux sensor 136. When the magnetic platens are demagnetized, the electronic processor advances to step 238, which enables opening/closing of the magnetic platens. The platens are manually opened to allow a molding machine operator to remove the mold using the remote crane controller 98.

At decision step 234, when the platens are magnetized, the electronic controller 110 advances to step 242. At step 242, the electronic processor provides a visual indication on the display 124, 184 of the molding machine 100 and/or an audible message or a warning signal is provided by the loudspeaker 128 that states that the magnetic platens must be demagnetized or the crane and hoist must be disconnected from the mold. Thereafter, the electronic processor 110 returns to step 216 and repeats the calculation of crane load.

From steps 228, 238 the electronic processor eventually returns to the set-up mode at step 204 unless the set-up mode is ended, and a new mode is selected by an operator of the molding machine 100.

In an alternative example, the proximity sensor 140 is also utilized in the arrangement shown in FIG. 7. In this example, the proximity sensor 140 must sense the presence of a mold adjacent the magnetic platen 160 before the flux sensor 136 senses that the magnetic platens are magnetized and that there is a proper magnetic circuit through the mold.

In an example of replacing a mold, an operator utilizes the remote crane controller 98 to move the crane 20 and the hoist 40 above the molding machine 10. The operator either before or after moving the crane 20, manually selects the set-up mode. Once the set-up mode is selected, the electronic processor 110 determines whether the position of the crane 20 having a hoist 40 is above the molding machine 100 with a crane position sensing arrangement 70. The electronic processor also determines whether a crane load greater than a marginal load value is being supported on the hoist 40 of the crane with a crane load sensor 82. Finally, the electronic processor receives a determination whether the magnetic platens are magnetized or demagnetized from a signal from a flux sensor.

Thereafter, the electronic processor 110 operates to enable movement of the movable magnetic platen 160 when the crane position sensing arrangement 70 senses that the crane 20 is above the molding machine 100; the crane load sensor 82 senses a load that is less than a marginal load value; and the flux sensor 136 senses that the magnetic platens are magnetized. In this state, the mold are secured to the magnetic platens.

The electronic processor 110 operates to enable movement of the movable platen to remove or insert a mold when the crane position sensing arrangement 70 senses that the crane 20 is above the molding machine 100; the crane load sensor 82 senses a crane load that is greater than the marginal load value; and the flux sensor 136 senses that the platens are demagnetized. At this time, the operator either operates the crane 20 to remove the mold or install the mold within the molding machine 100.

In one example, the electronic processor 110 provides an indication as indicia on a display and/or as an audible message that is output by a loudspeaker. In one example, the manual selection of the set-up mode is provided by the display including a touch screen 132 for manually selecting the set-up mode. In one example, an operator connects the hoist 40 to the mold to remove the mold from the molding machine. The operator actuates a button on a pendant 188 to demagnetize the magnetic platens 160 and then operates the crane 20 with the remote crane controller 98 to remove the mold from the molding machine after opening the movable magnetic platen.

FIG. 2 shows the bridge position sensor 74 and bridge movement drive 86 in communication with the electronic processor 60 of the crane 20. In another example, the bridge position sensor 74 and the bridge movement drive 86 are separate from the arrangement of FIG. 2 and includes a separate electronic processor and transceiver to receive signals from the remote crane controller 98 and change the position of the bridge 32 by driving the bridge along the rails 28.

The mold represents a mold having a first half and a second half in one example. In another example, a mold includes first and second sections and a third section that is attached to one or both of the first and second sections. The mold includes additional components in many of the examples. In some examples, the hook 44 connects directly to a mold. In other examples, a chain connects to the mold and to the hook 44.

While the electronic processor 110 performs the steps set forth in FIG. 7 and elsewhere is considered to be a single electronic controller performing the functions and steps detailed therein, in some examples, multiple electronic processors or controller units perform various functions. Further, the electronic processor 110 includes multiple electronic processors in some examples. Although various methods and processes have been described as being carried out by an electronic processor 110 in a particular order, in some cases the methods and processes are carried out in a different order.

In another example, the pendant 188 that is provided for controlling the magnetic platens 160, the flux sensor 136, the proximity sensor 140, the unit control circuit sensor, and the open/close platen drive 144 are part of a separate arrangement with a separate electronic processor and memory that are different from the electronic processor 110 and memory 114 of the molding machine. The set-up mode is executed by the separate arrangement in this example. In one example, the magnetic platens 160 are placed on the platens of a conventional molding machine 100 and a separate controller including an electronic processor is electrically connected to the flux sensor 136, the proximity sensor 140, the unit control circuit sensor and the open/close platen drive 144. The arrangement operates in a similar manner to the arrangement shown in FIG. 7.

The arrangement in FIG. 7 is one example for operation of a set-up mode. In other arrangements the order of the steps shown are different, but a similar operation occurs.

In addition, unless the context of their usage unambiguously indicates otherwise, the articles "a" and "an" should not be interpreted as meaning "one" or "only one." Rather these articles should be interpreted as meaning "at least one" or "one or more."

Although certain embodiments, examples, features, and aspects have been described and illustrated, variations and modifications exist within the scope and spirit of the subject matter explained and shown.

What is claimed is:

1. A molding machine for receiving a mold and for being operated to create molded products, the molding machine including:
    magnetic platens including a movable magnetic platen and a fixed magnetic platen for securing the mold thereto, the movable magnetic platen being movable to open and close a mold;
    a flux sensor for sensing whether the magnetic platens are magnetized and supporting the mold by a magnetic circuit that is completed via presence of ferrous material in the mold or that the magnetic platens are demagnetized;
    an input device for selecting operating conditions for the molding machine;
    a display for displaying operating conditions for the molding machine; and
    an electronic processor for when a set-up mode is selected, the electronic processor being configured to:
        enable movement of the movable platen when the molding machine receives a crane position signal that a hoist of the crane is above the molding machine; the molding machine receives a crane load signal wherein a crane load is less than a marginal load value; and the flux sensor senses that the platens are magnetized and that the magnetic circuit is completed via presence of ferrous material in the mold; and
        enable movement of the movable platen to remove/insert the mold when the molding machine receives a crane position signal that the hoist of the crane is above the molding machine; the molding machine receives a crane load signal wherein a crane load is greater than the marginal load value; and the flux sensor senses that the magnetic platens are demagnetized and the magnetic circuit is not completed.

2. The molding machine of claim 1, wherein in the set-up mode, the electronic processor is further configured to:
    when the molding machine receives a crane position signal that the crane is above the molding machine; the molding machine receives a crane load signal wherein a crane load is less than a marginal load value; and the flux sensor senses that the platens are demagnetized and the magnetic circuit is not completed, the display provides an indication to either magnetize the magnetic platens or to connect a hook of the hoist to the mold to load the crane; and
    when the molding machine receives a crane position signal that a crane is above the molding machine; the molding machine receives a crane load signal wherein a crane load is greater than the marginal load value; and the flux sensor senses that the magnetic platens are magnetized and that the magnetic circuit is completed via presence of ferrous material in the mold, the display provides an indication to either demagnetize the magnetic platens or to remove the load from the hoist of the crane.

3. The molding machine of claim 2, wherein the indication is provided as indicia on the display and/or as an audible message output by a loudspeaker, and wherein a chain connects the mold to the hook.

4. The molding machine of claim 1, wherein the electronic processor is further configured to enable movement of the movable platen when the molding machine receives the crane position signal that the crane is above the molding machine; the molding machine receives the crane load signal wherein a load is less than a marginal load value; the flux sensor senses that the magnetic platens are magnetized and that the magnetic circuit is completed via presence of ferrous material in the mold; and further a proximity sensor senses presence of the mold.

5. The molding machine of claim 1, wherein the electronic processor enables movement of the movable magnetic platen by executing instructions stored in a non-transitory memory, and wherein the magnetic platens are secured to platens of the molding machine.

6. The molding machine of claim 1, wherein the display for displaying operating conditions for the molding machine includes a touch screen that includes the input device.

7. The molding machine of claim 1, further including a receiver for receiving the crane load signal and the crane position signal.

8. The molding machine of claim 7, wherein the receiver provides the crane load signal and the crane position signal to the electronic processor via an input/output interface.

9. The molding machine of claim 1, wherein the electronic processor receives the crane load signal and the crane position signal from a transceiver of a crane.

10. A molding machine system comprising:
a crane including a hoist on a trolley for setting and pulling of molds, the crane further including:
a crane position sensing arrangement for determining a position of the crane and hoist;
a crane load sensor for sensing a load supported on the hoist;
a molding machine for receiving a mold and for being operating to create molded products, the molding machine including:
a movable magnetic platen and a fixed magnetic platen for securing the mold thereto, the movable magnetic platen being movable to open and close a mold;
a flux sensor for sensing whether the magnetic platens are magnetized and supporting the mold by a magnetic circuit that is completed via presence of ferrous material in the mold, or sensing that the magnetic platens are demagnetized and the magnetic circuit is not completed;
an input device for selecting operating conditions for the molding machine;
a display for displaying operating conditions for the molding machine; and
an electronic processor for when a set-up mode is selected, the electronic processor being configured to:
enable movement of the movable magnetic platen when the crane position sensing arrangement senses that the crane is above the molding machine; the crane load sensor senses a load that is less than a marginal load value; and the flux sensor senses that the magnetic platens are magnetized and the magnetic circuit is completed; and
enable movement of the movable magnetic platen to remove/insert the mold when the crane position sensing arrangement senses that the crane is above the molding machine; the crane load sensor senses a load that is greater than the marginal load value; and the flux sensor senses that the magnetic platens are demagnetized and the magnetic circuit is not completed.

11. The molding machine system of claim 10, wherein in the set-up mode, the electronic processor is further configured to:
when the crane position sensing arrangement senses that the hoist of the crane is above the molding machine; the crane load sensor senses a load that is less than a marginal load value; and the flux sensor senses that the magnetic platens are demagnetized and the magnetic circuit is not completed, provide an indication to either magnetize the magnetic platens or to connect the hoist to the mold to load the crane; and
when the crane position sensing arrangement senses that the hoist of the crane is above the molding machine; the crane load sensor senses a load that is greater than the marginal load value; and the flux sensor senses that the magnetic platens are magnetized and the magnetic circuit is completed, provide an indication to either demagnetize the magnetic platens or to remove the load from the hoist of the crane.

12. The molding machine system of claim 10, wherein the hoist and trolley of the crane are positioned on a bridge, and the bridge is movable along opposing parallel rails at ends thereof in a first direction of the parallel rails, the hoist and the trolley being movable along the length of the bridge in a second direction,
wherein a remote crane controller controls movement of the bridge in the first direction and controls movement of the hoist and the trolley in the second direction that is orthogonal to the first direction, and
wherein the crane position sensing arrangement includes a bridge position sensor that determines the position of the bridge relative to the rails and a trolley position sensor that determines the position of the trolley and the hoist along a length of the bridge.

13. The molding machine system of claim 10, wherein the electronic processor is further configured to enable movement of the movable magnetic platen when the crane position sensing arrangement senses that the crane is above the molding machine; the crane load sensor senses a load that is less than a marginal load value; the flux sensor senses that the magnetic platens are magnetized and the magnetic circuit is completed; and further a proximity sensor senses presence of the mold.

14. The molding machine system of claim 10, wherein the electronic processor enables movement of the movable magnetic platen by executing instructions stored in a non-transitory memory.

15. The molding machine system of claim 10, wherein the display for displaying operating conditions for the molding machine includes a touch screen that includes the input device.

16. The molding machine system of claim 10, wherein the magnetic platens are secured to platens of the molding machine, and wherein the magnetic platens and the flux sensor are part of a separate arrangement with a separate electronic processor and a separate memory that are different from the electronic processor of the molding machine.

17. The molding machine system of claim 10, wherein the crane includes a transceiver for transmitting the crane load signal and the crane position signal to the molding machine.

18. The molding machine system of claim 10, wherein the electronic processor receives the crane load signal and the crane position signal from the crane.

19. The molding machine system of claim 10, wherein the molding machine includes a receiver for receiving the crane load signal and the crane position signal from the crane.

20. The molding machine system of claim 19, wherein the receiver provides the crane load signal and the crane position signal to the electronic processor via an input/output interface.

* * * * *